Oct. 28, 1958
F. G. SLONEK
2,857,773
CAMSHAFT DRIVE SYSTEM
Filed Sept. 20, 1954
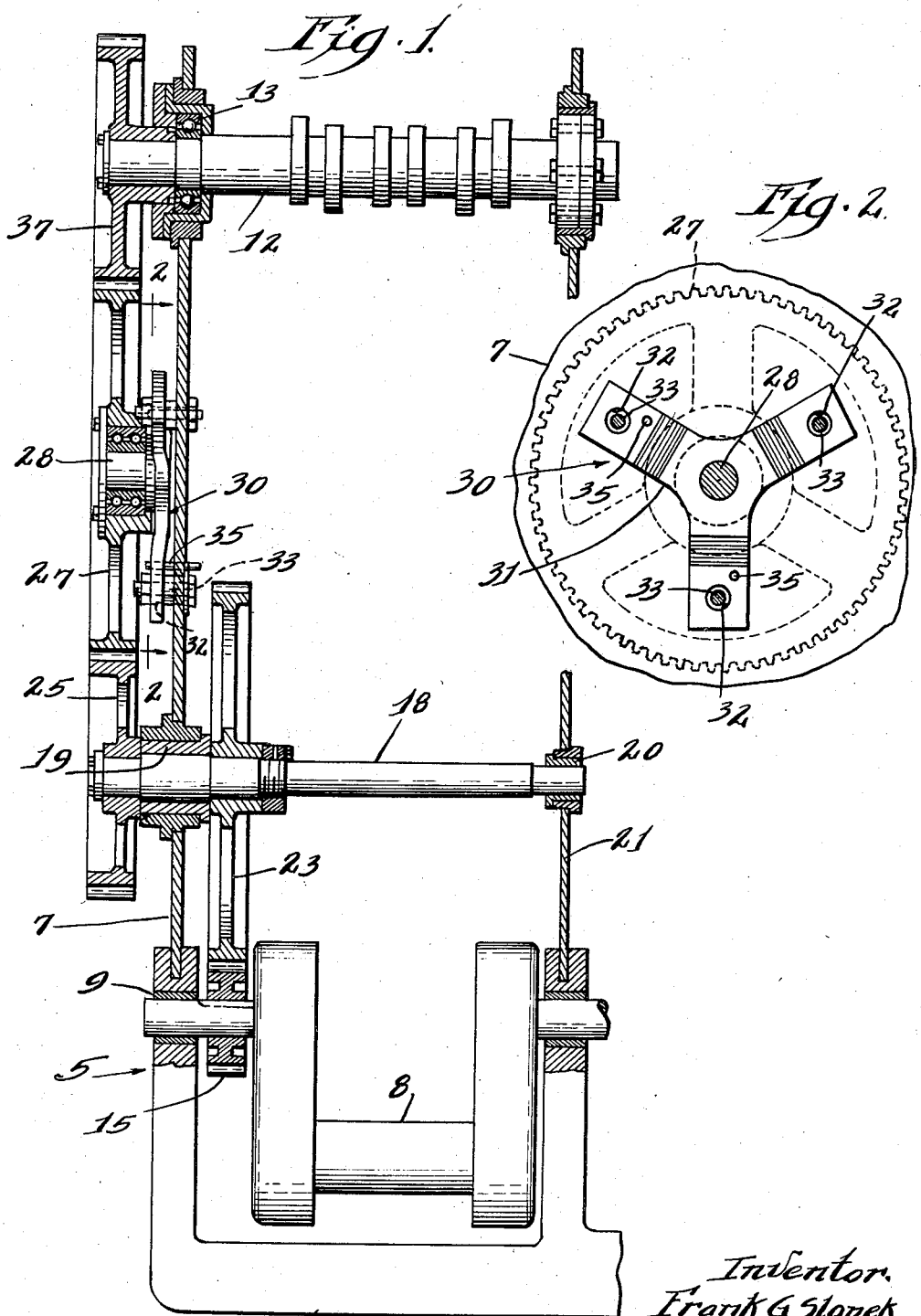
Inventor.
Frank G Slonek.
By Zabel, Baker, York, Jones and Dithmar
Attorneys.

2,857,773
CAMSHAFT DRIVE SYSTEM

Frank G. Slonek, Chicago, Ill., assignor to Page Engineering Company, Chicago, Ill., a corporation of Illinois Application September 20, 1954, Serial No. 457,258

2 Claims. (Cl. 74—401)

This invention relates to a camshaft drive system for use in an engine wherein a camshaft is driven by a crankshaft. The drive system of the invention includes a gear train extending between the crankshaft and camshaft.

Prior camshaft drive systems of which I have knowledge are noisy in operation due to inability to achieve proper relationships between certain cooperating elements in the gear train. Another shortcoming of such prior systems involves the effect of wear on the operation of the timing shaft, a shaft which carries two gears of the gear train. As wear occurs, the timing shaft tends to rock or wobble and the eccentricity thus introduced produces noisy operation of the gears and eventual structural failure.

One object of the invention, therefore, is to improve the bearing arrangement for the timing shaft by providing two spaced bearings for the shaft. The shaft possesses substantial length in order to accommodate the two bearings.

Another object of the invention is to provide a camshaft drive system wherein an idler gear of the gear train is mounted on an adjustable element whereby the idler gear axis may be shifted in position during assembly of the engine in order to establish an optimum relationship between the idler gear and the two gears with which it meshes. This feature eliminates noisy operation occasioned by improper location of the idler gear with respect to the other gears.

The present camshaft drive system may be embodied in a horizontal V-type diesel engine, although it is susceptible to use in engines of other types. A horizontal V-engine and some of its various features are shown in my copending U. S. patent applications for Diesel Engine and Excavating Machine Embodying Same, Serial No. 457,257, filed September 20, 1954; Timing System for Diesel Engine, Serial No. 457,259, filed September 20, 1954, and Cooling System for Diesel Engine, Serial No. 457,261, filed September 20, 1954.

Other objects, advantages and details of the invention will be apparent as the description proceeds, reference being had to the accompanying drawing wherein one form of the invention is shown. It is to be understood that the drawing and description are illustrative only and that the scope of the invention is to be measured by the appended claims.

In the drawing:

Fig. 1 is a sectional view through a portion of an engine showing a camshaft drive system embodying the invention, and Fig. 2 is a sectional view on line 2—2 of Fig. 1 showing certain details of the invention.

Referring to the drawing, subject camshaft drive system is incorporated in an engine, a portion of which is designated generally by 5. Engine 5 includes an engine frame 6 having an end wall 7.

A crankshaft 8 is journalled in bearings carried by engine frame 6, one of the bearings, namely bearing 9, being mounted in end wall 7.

Engine 5 also has a camshaft 12 journalled in bearings carried in engine frame 6, one of the bearings, namely bearing 13, being mounted in end wall 7. Subject drive system, as will be seen, includes a gear train extending between crankshaft 8 and camshaft 12.

A first gear 15 is keyed to crankshaft 8, gear 15 being located on the inside of end wall 7 as shown in Fig. 1. Gear 15 forms one element, the driving element, of the gear train.

An elongated timing shaft 18 is disposed adjacent to and in parallel relationship with crankshaft 8. Timing shaft 18 is provided with a pair of bearings 19 and 20, one bearing being located at each end region of the shaft. Bearing 19 is carried by end wall 7 while bearing 20 is carried by member 21 of engine frame 6.

Bearings 19 and 20 are spaced apart by a distance greater than the diameter of an engine cylinder. This arrangement of two spaced bearings for timing shaft 18 insures adequate support for the shaft and the elimination of difficulties due to bearing wear.

A second gear 23 is keyed to shaft 18 adjacent one of the shaft bearings, namely bearing 19 of end wall 7. Second gear 23 is located on the inside of end wall 7 and hence sometimes is referred to as the "inside second gear." As shown in Fig. 1, second gear 23 meshes with first gear 15 carried on crankshaft 8.

A third or "timing" gear 25 also is keyed to timing shaft 18, gear 25 being located on the side of bearing 19 opposite second gear 23. Gear 25 thus is on the outside of end wall 7, as shown in Fig. 1.

An adjustable axis idler fourth gear 27 is mounted in position to mesh with outside third or "timing" gear 25. Idler fourth gear 27 is mounted for rotation on a stub shaft 28 which is carried by an adjustable support element 30.

Adjustable support element 30 as here shown comprises a three-armed spider 31 (Fig. 2). Each spider arm near its end is provided with an aperture 32 of diameter somewhat greater than that of a stud 33 which extends through an aperture 32 into secured relationship with engine end wall 7.

As will be seen, spider 31 is mounted on end wall 7 in unadjusted relation by means of the several studs 33. Thereafter, and usually during engine assembly, spider 31 is adjusted so that idler fourth gear 27 is brought into proper relationship with the gears with which it meshes. When this relationship is determined, studs 33 are tightened to retain the proper positioning.

After the proper position has been determined and the studs tightened, positioning holes preferably are drilled in at least two of the spider arms, the holes extending into end wall 7. Positioning dowel pins.35 are inserted in the holes so that thereafter spider 31 may be removed and replaced without losing the established positioning.

A fifth or "cam" gear 37 is keyed to camshaft 12 on the outside of end wall 7. Idler fourth gear 27 also meshes with and drives fifth or "cam" gear 37 which in turn drives camshaft 12.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. In an engine, a crankshaft and gear fixed thereon, a camshaft and gear fixed thereon, an elongated timing shaft of restricted length adjacent said crankshaft, a pair of spaced bearings for said timing shaft, a pair of gears fixed to said timing shaft and located one on each side of one of said bearings and in adjacent relation thereto, one of said last-named gears engaging said crankshaft gear, an adjustable stub shaft assembly mounted on an engine portion between said timing shaft and said camshaft and including a stub shaft and an idler gear thereon, said idler gear in engagement with said camshaft gear and the other gear of said timing shaft.

2. The combination of claim 1 wherein said adjustable stub shaft assembly also includes a plate member having a plurality of spaced apertures therein, and stud means extending through said apertures to secure said plate member to said engine portion, the diameter of said stud means being smaller than that of said apertures to permit adjustment of said plate member.

References Cited in the file of this patent

UNITED STATES PATENTS

| | | |
|---|---|---|
| 1,175,820 | Rounds | Mar. 14, 1916 |
| 1,309,279 | Eggett | July 8, 1919 |
| 1,413,213 | Badger | Apr. 18, 1922 |
| 1,520,942 | Garrett | Dec. 30, 1924 |
| 2,415,278 | Charles | Feb. 4, 1947 |
| 2,426,960 | Wesselhoff | Sept. 2, 1947 |
| 2,691,553 | Pettigrew | Oct. 12, 1954 |
| 2,704,693 | Schwan | Mar. 22, 1955 |